US012425781B2

(12) United States Patent
Zhang et al.

(10) Patent No.: US 12,425,781 B2
(45) Date of Patent: Sep. 23, 2025

(54) MOBILE DEVICE THAT PROVIDES SOUND ENHANCEMENT FOR HEARING DEVICE

(71) Applicant: STARKEY LABORATORIES, INC., Eden Prairie, MN (US)

(72) Inventors: Tao Zhang, Eden Prairie, MN (US); Daniel Marquardt, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 288 days.

(21) Appl. No.: 18/024,221

(22) PCT Filed: Jul. 15, 2021

(86) PCT No.: PCT/US2021/041841
§ 371 (c)(1),
(2) Date: Mar. 1, 2023

(87) PCT Pub. No.: WO2022/051032
PCT Pub. Date: Mar. 10, 2022

(65) Prior Publication Data

US 2023/0276182 A1 Aug. 31, 2023

Related U.S. Application Data

(60) Provisional application No. 63/073,129, filed on Sep. 1, 2020.

(51) Int. Cl.
*H04R 25/00* (2006.01)

(52) U.S. Cl.
CPC ......... *H04R 25/507* (2013.01); *H04R 25/558* (2013.01); *H04R 2225/41* (2013.01); *H04R 2225/43* (2013.01); *H04R 2225/55* (2013.01)

(58) Field of Classification Search
CPC H04R 25/507; H04R 25/558; H04R 2225/41; H04R 2225/43; H04R 2225/55; H04R 25/04; H04R 25/554
See application file for complete search history.

(56) References Cited

U.S. PATENT DOCUMENTS 7,650,004 B2 1/2010 Durant
8,355,794 B2 1/2013 Lineaweaver et al.
(Continued)

FOREIGN PATENT DOCUMENTS

CN 105611477 6/2018
DE 102019203786 A1 2/2020
(Continued)

OTHER PUBLICATIONS

Diehl et al. WO 2020/152323 A1 Signal Processing Device, System and Method for Processing Audio Signals. (Year: 2020).*
(Continued)

*Primary Examiner* — Brian Ensey
(74) *Attorney, Agent, or Firm* — Mueting Raasch Group

(57) ABSTRACT

A system includes a mobile device that receives an audio signal from a microphone of the mobile device. The mobile device processes the audio signal via a neural network to obtain a speech-enhanced audio signal. The system includes an ear-wearable device comprising a data interface operable to communicate with the external data interface of the mobile device. The ear-wearable device includes an audio processing path coupled to the data interface and is operable to receive the speech-enhanced audio signal and reproduce the speech-enhanced audio in an ear of a user.

18 Claims, 8 Drawing Sheets

(56) References Cited

U.S. PATENT DOCUMENTS

| | | | | |
|---|---|---|---|---|
| 8,494,193 | B2 | 7/2013 | Zhang et al. | |
| 10,575,103 | B2 | 2/2020 | Fitz et al. | |
| 10,652,674 | B2 | 5/2020 | Lederman | |
| 10,871,943 | B1 | 12/2020 | D'Amato | |
| 11,190,898 | B2 | 11/2021 | Tang | |
| 11,792,580 | B2 | 10/2023 | Diehl | |
| 2004/0111385 | A1 | 6/2004 | Starkey | |
| 2011/0137656 | A1 | 6/2011 | Xiang | |
| 2017/0311095 | A1 | 10/2017 | Fitz et al. | |
| 2018/0227682 | A1 | 8/2018 | Lederman | |
| 2019/0052977 | A1 | 2/2019 | Hannemann et al. | |
| 2019/0132687 | A1 | 5/2019 | Santos et al. | |
| 2019/0149927 | A1 | 5/2019 | Zhang et al. | |
| 2020/0059740 | A1 | 2/2020 | Xu et al. | |
| 2020/0260198 | A1 | 8/2020 | Andersen | |
| 2020/0296510 | A1 * | 9/2020 | Li | H04R 1/1083 |

FOREIGN PATENT DOCUMENTS

| | | | |
|---|---|---|---|
| EP | 2071875 | B1 | 6/2011 |
| EP | 2617127 | B1 | 1/2017 |
| EP | 3514792 | | 7/2019 |
| EP | 3346732 | B2 | 10/2020 |
| EP | 3806496 | | 4/2021 |
| GB | 2456297 | | 7/2009 |

OTHER PUBLICATIONS

International Patent Application No. PCT/US2021/041841, filed Jul. 15, 2021; International Search Report / Written Opinion issued Oct. 29, 2021; 10 pages.

Zhang, "Deep Learning Based Binaural Speech Separation in Reverberant Environments" May 2017 *IEEE/ACM Transactions on Audio, Speech, and Language Processing*, vol. 25(5) pp. 1075-1084.

PCT Search Report and Written Opinion for PCT/US2021/032926 dated Aug. 25, 2021 (21 pages).

Healy et al, "An Algorithm to Improve Speech Recognition in Noise for Hearing-Impaired Listeners", The Journal of the Acoustical Society of America, American Institute of Physics for Acoustical Society of America, New York, NY, vol. 134, No. 4, Oct. 4, 2013, pp. 3029-3038.

* cited by examiner

MOBILE DEVICE THAT PROVIDES SOUND ENHANCEMENT FOR HEARING DEVICE

SUMMARY

This application is a § 371 U.S. National Stage of International Application No. PCT/US2021/041841, filed Jul. 15, 2021, which claims the benefit of U.S. Provisional Application No. 63/073,129, filed Sep. 1, 2020, the entire content of each of which are hereby incorporated by reference.

This application relates generally to ear-wearable electronic systems and devices, including hearing aids, personal amplification devices, and hearables. In one embodiment, methods and systems are described that receive an audio signal from a microphone of a mobile device. The mobile device processes the audio signal via a neural network to obtain a speech-enhanced audio signal. The system includes an ear-wearable device comprising a data interface operable to communicate with the external data interface of the mobile device. The ear-wearable device includes an audio processing path coupled to the data interface and is operable to receive the speech-enhanced audio signal and reproduce the speech-enhanced audio in an ear of a user.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
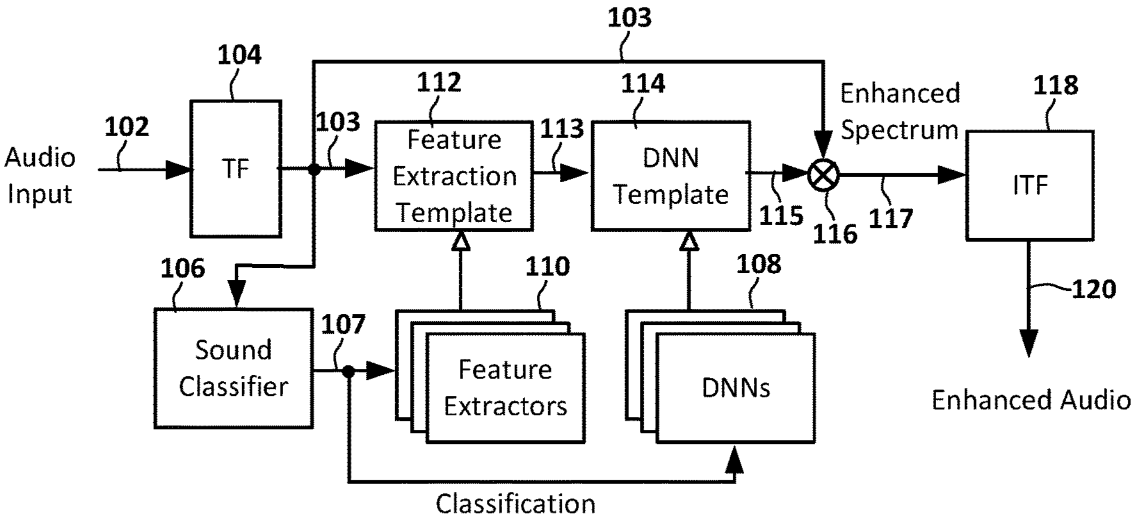
FIG. 1 is a schematic diagram of an audio processing path according to an example embodiment.

Embodiments disclosed herein are directed to speech enhancement in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices" or "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which are used interchangeably and understood to refer to a system comprising a single left ear device, a single right ear device, or a combination of a left ear device and a right ear device.

Speech enhancement (SE) is an audio signal processing technique that aims to improve the quality and intelligibility of speech signals corrupted by noise. Due to its application in several areas such as automatic speech recognition (ASR), mobile communication, hearing aids, etc., several methods have been proposed for SE over the years. Recently, the success of deep neural networks (DNNs) in automatic speech recognition led to investigation of DNNs for noise suppression for ASR and speech enhancement. Generally, corruption of speech by noise is a complex process and a complex non-linear model like DNN is well suited for modeling it.

The present disclosure includes descriptions of embodiments that utilize a DNN to enhance sound processing. Although in hearing devices this commonly involves enhancing the user's perception of speech, such enhancement techniques can be used in specialty applications to enhance any type of sound whose signals can be characterized, such as music, animal noises (e.g., bird calls), machine noises, pure or mixed tones, etc. Generally, the embodiments use simplified DNN models that can operate effectively on devices that have practical limitations on power, processing capability, memory storage, etc.

In FIG. 1, a schematic diagram shows a sound enhancement processing path according to an example embodiment. The system receives an input signal 102, which is a time-domain audio signal that is typically digitized. The input signal 102 is converted to a frequency domain signal 103, e.g., using a time-frequency (TF) transform 104 such as a fast-Fourier transform (FFT). This frequency domain signal 103 is analyzed and subject to enhancement by a DNN as described below.

A sound classifier 106 analyzes various combinations of features of the frequency domain signal 103 (e.g., periodicity strength measurements, high-to-low-frequency, energy ratio, spectral slopes in various frequency regions, average spectral slope, overall spectral slope, spectral shape-related features, spectral centroid, omni signal power, directional signal power, energy at a fundamental frequency) and classifies 107 the current signal into one of a plurality of categories. The categories may be based on such characteristics as strength and character of background noise, reverberation/echo, power spectral density, etc. Further details on sound classification methods are described in commonly-owned U.S. Patent Publication 2011/0137656 and U.S. Pat. No. 8,494,193.

The classification 107 from the sound classifier 106 is used to select one of a plurality of simplified DNN models 108 that have been trained to provide sound enhancement for the particular classification 107. Generally, each of the DNN models 108 take as inputs a selected (and possibly different) set of features from the frequency domain signal 103. Thus in addition to selecting a particular DNN, the classification 107 is also used to select from a set of feature extractors 110, which generally define the features required for a particular one of the DNNs 108.

In the illustrated example, the ability to change DNNs based on a sound classification is indicated by feature extraction template 112 and DNN template 114. Generally, these templates 112, 114 indicate an abstract function that can be instantiated at run time with a particular implementation. The feature extraction template 112, when instantiated, will be used to set up the necessary processing operations, e.g., extraction of features 113 from a selected set of frequency bands, as well as the pipelines to feed the extracted features 113 into the selected DNN model. The DNN template 114, when used to instantiate a classifier-specific DNN, will load pre-trained weights and biases into memory, and make the necessary connections to receive the instantiated features 113 as one or more data streams, as well as set the output stream(s) to the appropriate signal processing elements.

It will be understood that the illustrated templates 112, 114 are just one example of how multiple DNNs may be used in a hearing device, and other programming paradigms may be used to implement the indicated functionality. Also, other features may be abstracted if such features change with a selected DNN. For example, if different DNNs 108 have different output vectors, then an output vector abstraction similar to the feature abstraction template 112 may be used to process and stream the output data downstream. Also, changing the DNN may trigger changes to other processing elements not shown, such as equalization, feedback cancellation, etc.

Generally, the selected DNN that is loaded via the DNN template 114 processes the extracted features 113 and provides output data 115 that are combined with the frequency-domain data stream 103 as indicated by combination block 116. For example, the output 115 may include at least a series of spectral weights that are applied to different frequency bands across the spectrum. The spectral weights are multiplied with the frequency domain audio signal 103 to enhance speech (or any other targeted audio feature) and/or attenuate noise. The resulting enhanced spectrum 117 is inverse-transformed back into the time domain, e.g.., using inverse TF (ITF) block 118. The output of the ITF block 118 is an enhanced audio signal 120, e.g., enhanced to emphasize speech. This signal 120 can be processed as known in the art, e.g., converted from digital to analog, amplified, and turned into sound waves via a receiver/loudspeaker.

Figure 2:
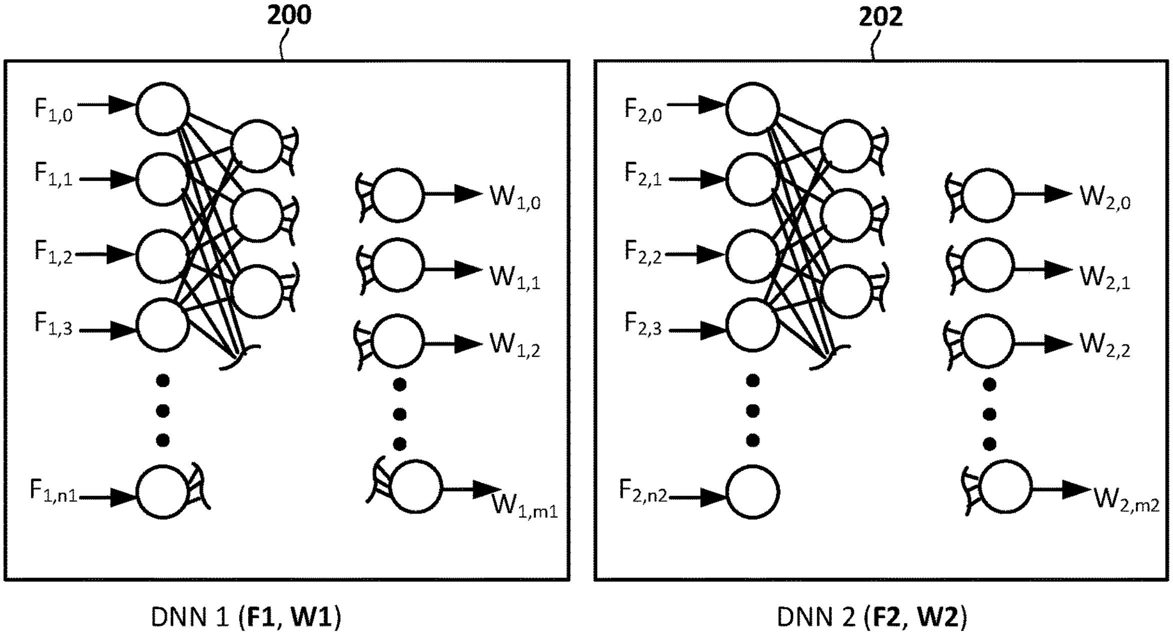
FIG. 2 is a block diagram showing multiple neural networks usable in a hearing device according to an example embodiment.

In FIG. 2, a block diagram shows an example of multiple neural networks that may be used with a processing path as shown in FIG. 1. In this example, two DNNs 200, 202 are shown that may be used for sound enhancement. Each DNN 200, 202 may have a unique input feature vector F1, F2, and output vector W1, W2. The size of these vectors affects the size of the resulting network 200, 202 and also affects any upstream or downstream processing components that are coupled to the networks 200, 202.

The networks 200, 202 may also have other differences that are not reflected in the input and output vectors. For example, the number and type of hidden layers within each neural network 200, 202 may be different. The type of neural networks 200, 202 may also be different, e.g., feedforward, (vanilla) recurrent neural network (RNN), long short-term memory (LSTM), gated recurrent units (GRU), light gated recurrent units (LiGRU), convolutional neural network (CNN), spiking neural networks, etc. These different network types may involve different arrangements of state data in memory, different processing algorithms, etc.

Figure 3A:
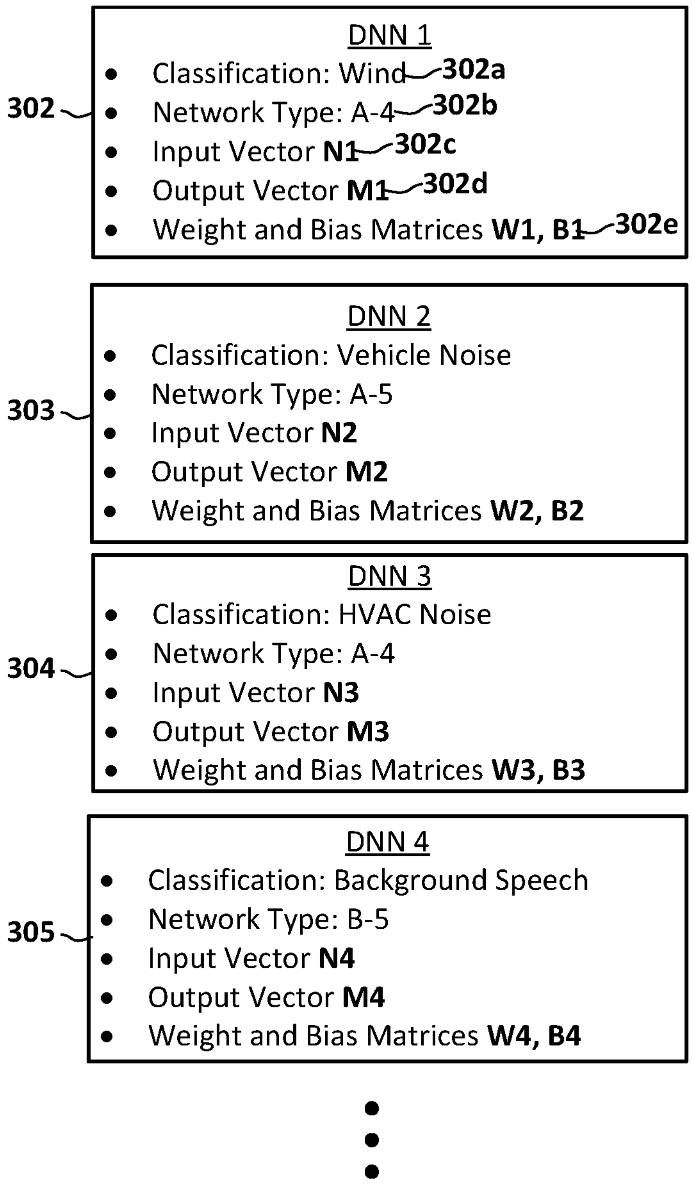
FIG. 3A is a diagram showing example neural network data structures according to an example embodiment.

In FIG. 3A, a diagram shows different types of data that may be stored on a non-volatile memory to instantiate different types of deep neural networks according to an example embodiment. Each block 302-305 represents data that may be used to dynamically instantiate and use a DNN based on a current sound context (e.g., acoustic scene). Using block 302 as a representative example, the data includes a classification 302*a* that would match a classification provided from a sound classifier, e.g., classifier 106 in FIG. 1. In the example of FIG. 3A, the classifications are based on commonly-encountered types of background noises, but other classifications may be used.

Data 302*b* in block 302 indicates a type of network. Although the networks are generally DNNs, there may be many variations within that classification. In this example the letter 'A' indicates a type of network, e.g., feedforward, RNN, CNN, etc. The number '4' indicates a number of hidden layers. There may be more complicated classifications for some network types. For example, CNNs may have hidden layers that include both pooling layers and fully connected layers.

The data 302*c-d* represent input and output vectors. This data 302*c-d* is generally metadata that is used by other parts of the processing stream to input data to the DNN and output data from the DNN. The data 302*c-d* will at least include a number of inputs (the size of the vectors), the format of data (e.g., real values from 0.0-1.0, binary values, integers from 0-255, etc.), the type (e.g., log spectral amplitude for band X) and order of the data within the vectors that are input to and output from the DNN.

Finally, data 302*e* includes matrices (or some other data structure) that store weights, biases, and other state data associated with each the network elements (e.g., sigmoid neurons). These matrices 302*e* represent the "intelligence" of the network, and are determined in a training phase using test data. Generally, the test data is "selected" to highlight the audio components that should be emphasized (e.g., speech) in the output signal and the components (e.g., noise) that should be attenuated. The training involves inputting the test data to an initialized network (e.g., weights and biases of the neurons set to random values) and comparing the output with a reference to determine errors in the output. For example, the same voice signal can be recorded using high and low SNR paths (e.g., adding naturally occurring or artificially generated noise in the latter case), the former being used as the reference and the latter as the test data. The errors are used to adjust state variables of the network (e.g., weights and biases in the neurons) and the process repeated until the neural network achieves some level of accuracy or other measure of performance. The training may also involve pruning and quantization of the DNN model, which helps reduce the computation resources used in running the model in a hearing device.

Generally, quantization involves using smaller representations of the data used to represent the elements of the neural network. For example, values may be quantized within a −1 to 1 range, with weights quantized to 8-bit values and activations quantized to 16-bit values. Equation (1) below shows a linear quantization according to an example embodiments. Custom quantization layers can be created to quantize all weight values during feedforward operation of the network.

$$LinearQuantization(x, \text{bitwidth}) = \text{Clip}\left(\frac{\text{round}\left(x \times 2^{bitwidth-1}\right)}{2^{bitwidth-1}}, -1, \frac{2^{bitwidth-1}-1}{2^{bitwidth-1}}\right) \quad (1)$$

Figure 3B:
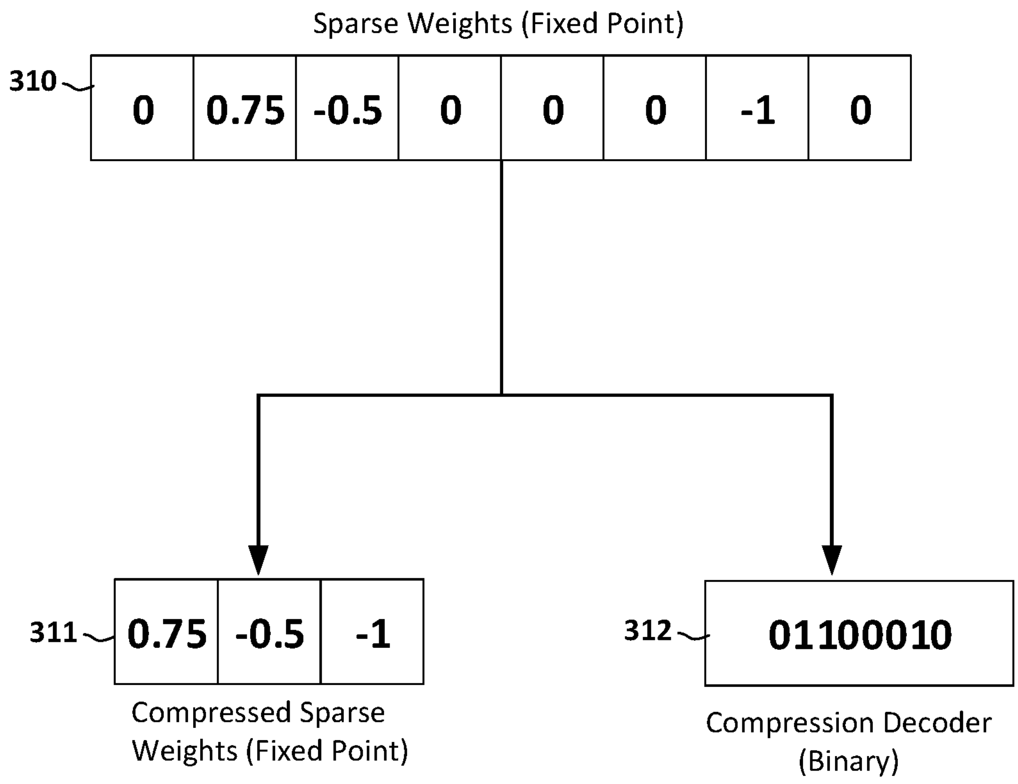
FIG. 3B is a diagram showing data structures used in pruning of a neural network according to an example embodiment.

Weights and biases can be pruned using threshold-based pruning that removes lower magnitude weights, e.g., with a magnitude close to zero for both positive and negative numbers. Percentages used in the threshold-based pruning can set to acquire a target weight sparsity during training. As seen in FIG. 3B, an example set of eight weights 310 is shown to which pruning has been applied, resulting in three non-zero weights. This allows compressing the representation of the weights in storage, as well as reducing the memory footprint and number of computations involved in running the DNN. For example, the three non-zero values can be stored in just three memory locations instead of eight as sparse representation 311. Further, any DNN nodes with zero weights need not be instantiated in the DNN. An 8-bit block decoder data 312 is associated with the sparse representation 311. Each '1' in the data 312 indicates where, in the original representation 310, that the numbers stored in the compressed representation 311 belong, in order from left to right.

Because the test data used to train the networks are selected to be in narrowly-defined audio categories, more simplified DNN models can be used to enhance sound within those environments. This allows reducing the memory and processing resources consumed by the data objects (e.g., objects 302-305 shown in FIG. 3A), while still achieving good levels of performance under operating conditions similar to what was used in training the models. When a change in the auditory environment is detected, a different data object 302-305 can be loaded into memory in place of a currently used object 302-305, and the signal processing path will switch to this new object for sound enhancement.

Figure 4:
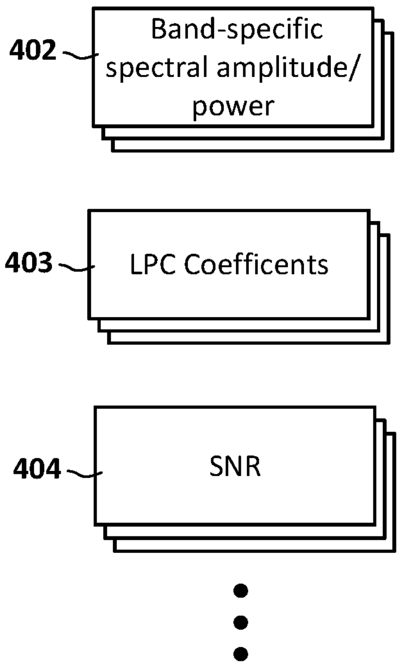
FIG. 4 is a diagram showing examples of neural network input features according to an example embodiment.

When building and training DNN models, the system designer may have a number of features derived from the audio stream to use as inputs to the models. Generally, the fewer the input features, the smaller the DNN, and therefore careful selection of input features can realize compact but effective enhancement models. In FIG. 4, a diagram shows an example of features that may be used in sound enhancement DNNs according to an example embodiment.

One set of features that is commonly used in sound enhancement is indications of amplitude and/or power 402 of various bands across the frequency range of the audio signal. Speech will generally occur within particular regions of the frequency range, while noise may occur over other ranges, the noise generally changing based on the ambient conditions of the user. In response, the sound enhancing DNN may act as a set of filters that emphasize the desired components while de-emphasizing the noise. Some environments may use a different number of bands within the frequency range of the signals, as well as bands that having different frequency extents.

With regards to speech, a hearing device may implement linear predictive coding (LPC) which analyzes the audio stream and extracts parameters related to the spectral envelope of speech in the signals. The LPC coding produces coefficients 403 that describe the speech signal in a compact format. Thus for speech enhancement DNNs, the LPC coefficients 403 may be used as inputs to the DNN. The hearing device may also have an estimator for current signal to noise ratio (SNR) 404, which may be calculated for different sub-bands. The SNR 404 may also provide useful information to a sound enhancement DNN under some conditions.

Figure 5:
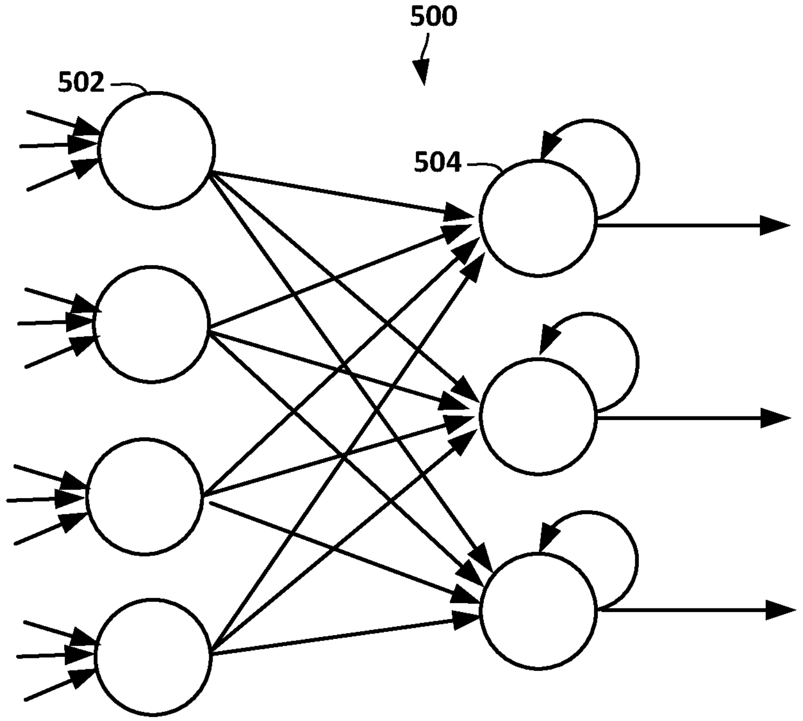
FIG. 5 is a block diagram of a recurrent neural network according to an example embodiment.

As described above, different types of neural networks may be deployed for different classifications of ambient acoustic conditions. The examples shown in FIG. 2, for example, are illustrated as feedforward neural networks. Another type of neural network useful for time-varying data is an RNN. An example of an RNN 500 is shown in FIG. 5. In addition to traditional neurons 502 that "fire" when the combination of inputs reaches some criterion, the RNN includes neurons 504 with a memory that takes into account previously processed data in addition to the current data being fed through the network. Examples of RNN nodes 504 include LSTM, GRU and LiGRU nodes which have been shown to be useful for such tasks as speech recognition.

Another type of DNN that may be used in the applications described herein is known as a spiking neural network. Spiking neural networks are a type of artificial neural networks that closely mimic the functioning of biological neurons to the extent of replicating communication through the network via spikes once a neuron's threshold is exceeded. They incorporate the concept of time into their operating model and are asynchronous in nature. This allows spiking neural networks to be suitable for low-power hardware implementations.

Figure 6:
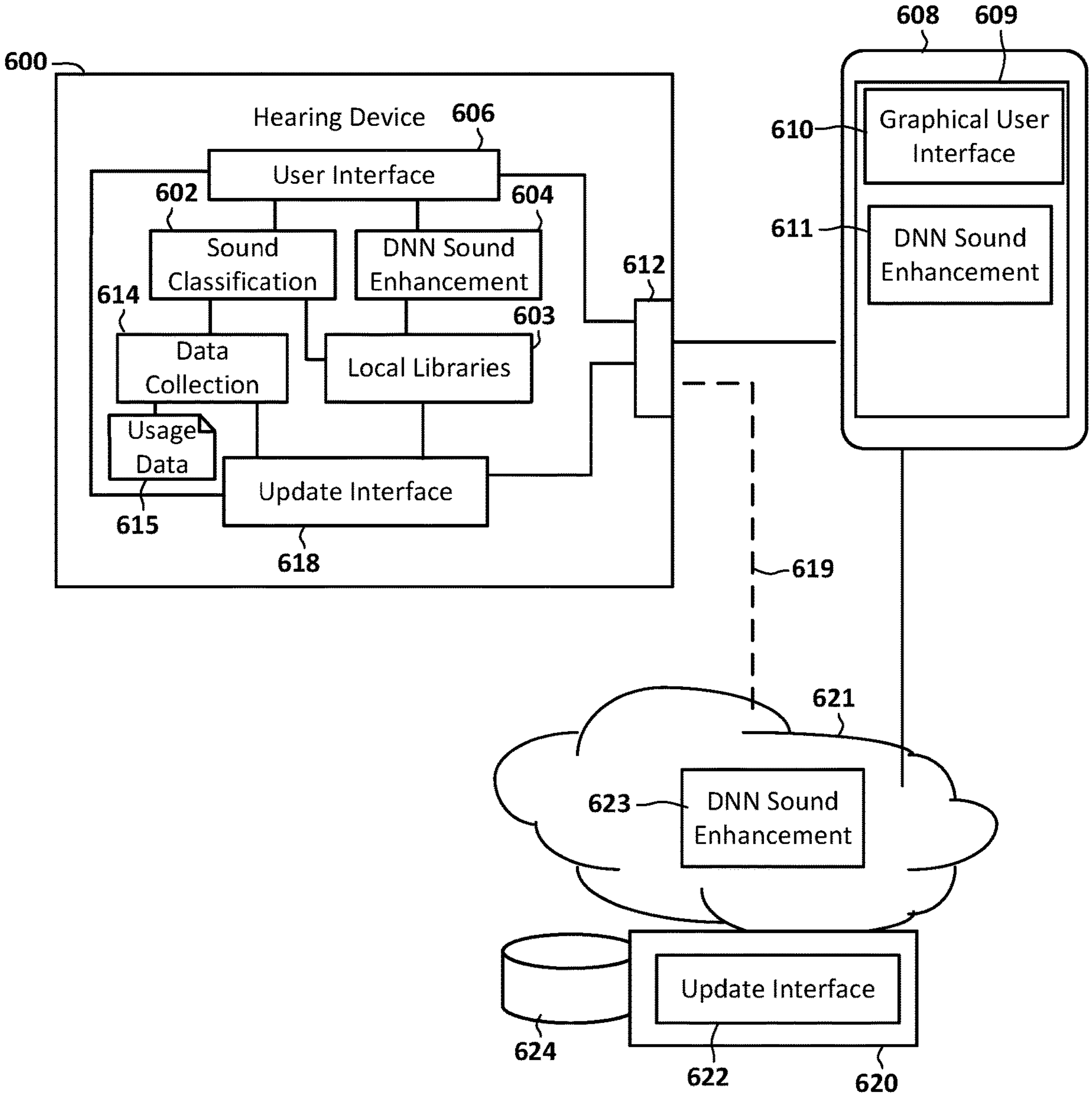
FIG. 6 is a block diagram of a system according to an example embodiment.

The use of swappable DNN models within a hearing device may have other advantages besides reducing the necessary computing resources. For example, a framework with generic interfaces as described above can be more easily modify the DNNs and related components in fielded devices compared to, for example, a firmware update. The stored DNN templates can be updated through firmware updates when new and/or improved DNN versions are developed. In FIG. 6, a block diagram shows a system for updating DNN models according to an example embodiment. A hearing device 600 includes a sound classifier 602 and DNN sound enhancer 604 as described elsewhere herein. The DNN sound enhancer 604 may select different DNN data (e.g., input/output streams, network weights) from a library 603 based on signals from the classifier 602.

The hearing device 600 also includes a user interface 606 that allows a user to change settings used by the sound classifier 602 and DNN sound enhancer 604. The user interface 606 may be programmatically accessed by an external device, such as mobile device 608, which has a touchscreen 609 that displays a graphical user interface 610. The mobile device 608 communicates with the hearing device 600 via a data interface 612, e.g., Bluetooth, USB, WiFi, etc. The graphical user interface 610 may allow the user to enable/disable the DNN sound enhancer 604, enable/disable various acoustic scenes available to the classifier 602, etc. The graphical user interface 610 may also allow the user to update the models used in sound classification and enhancement, including the ability to gather test data generated by the hearing device 600.

As shown in FIG. 6, a data collection module 614 may be used to collect audio and/or statistical data 615 related to the use and effectiveness of the sound enhancement 604. This usage data 615 may include automatically collected data such as types of classifications detected by classifier 602, measurements of the effectiveness of the enhancer 604, data input by the user via user interface 606 (e.g., problems noted, ratings on effectiveness, etc.). The usage data 615 may be sent, with the user's consent, to a network service 620 via a wide area network 621 (e.g., the Internet). Note that generally the mobile device 608 may intermediate communications between the hearing device 600 and the service 620, although as indicated by dashed line 619 it may be possible for the hearing device 600 to connect directly to the service 620, e.g., via an Internet connected charging cradle.

The service 620 may examine the performance of fielded units to indicate the success of different DNNs used by the enhancer 604. The usage data 615 can stored in a data store 624 be used to modify or updated the trained models to provide improved performance. Update interfaces 618, 622 on the hearing device 600 and service 620 may facilitate updating DNN models stored in the library 603, as well as other components such as the classifier 602. These updates may be stored remotely in data store 624, and be pushed out to subscribers by the service 620 via the interface 622. In some embodiments, the usage data 615 may be used to create custom DNN models specific to the environments encountered by a particular user. Such updates may be managed by the user via the user interface 606.

Also seen in the mobile device is a DNN sound enhancement application 611 that can replace and/or augment the functionality of the DNN sound enhancer 604. The mobile device 608 may have its own microphone and DSP functionality, e.g., for processing telephone calls, audio/video conferencing, audio/video recording, etc. The processing resources (e.g., instructions per second, amount of memory, memory and input/output bus speeds) of the mobile device 608 may be significantly greater than that of the hearing device 600, and so the mobile device 608 may be well suited for providing DNN sound enhancement functionality. In some embodiments, DNN processing may be provided via a network service, as indicated by DNN sound enhancer 623. Remote DNN processing may be feasible where high bandwidth, low latency connections are available, e.g., 5G networks, fiber networks, etc. Note that the update service 620 may also be used to update the enhancement application 611 on the mobile device 608 in a similar fashion as is described for updating the hearing device 600.

Figure 7:
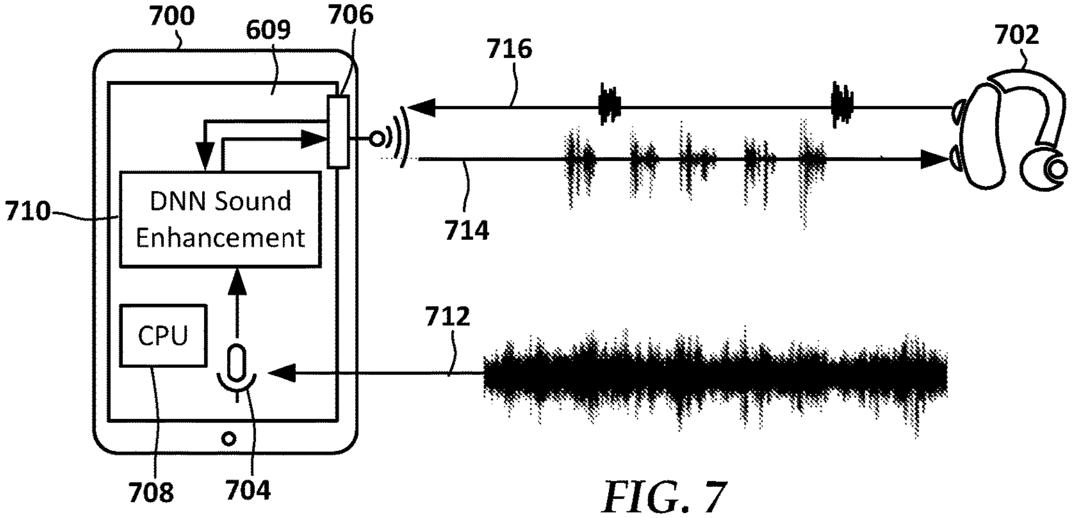
FIG. 7 is a block diagram showing interactions between components of a system according to an example embodiment.

In FIG. 7, a block diagram shows an implementation of mobile device 700 that is interoperable with an ear-wearable, hearing aid device 702 for purpose of sound enhancement. The mobile device includes a microphone 704 and an external data interface 706. A processor (e.g., CPU 708) coupled to the microphone 704 and the external data interface 706. The processor 708 is configured with instructions (e.g., DNN enhancement application 710) to receive an audio signal 712 via the microphone 704 and process the audio signal via a neural network to obtain a speech-enhanced audio signal 714.

The ear-wearable device 702 includes a data interface operable (see, e.g., interface 612 in FIG. 6) to communicate with the external data interface 706 of the mobile device. The ear-wearable device 702 includes an audio processing path coupled to the data interface and operable to receive the speech-enhanced audio signal 714 and reproduce the speech-enhanced audio in an ear of a user.

The DNN enhancement application 710 may include functionality similar to that of the ear-wearable device enhancement, e.g., as shown in the block diagram of FIG. 1. For example, the application 710 may include a sound classifier that characterizes the current ambient conditions in the audio signal 712 and choosing an appropriate DNN to provide enhancement. As will be described in more detail below, the application 712 may have access to sufficient processing power and memory to run multiple networks in parallel, and combine the outputs of different networks based on the ambient conditions.

Note that while the enhancement processing path shown in FIG. 1 can be implemented in known and/or custom-designed hardware, the application 710 may be expected to run on a large variety of general-purpose hardware that is used for different consumer mobile devices 700. There may also be a significant variety of operating systems, application program interfaces, and other system software running on the mobile device 700 that the application 710 may have access to. Therefore, the audio processing may be tailored to specific devices to account for, among other things, number and characteristics of available microphones, processing capability, type of local network and version of software stack, etc.

The ear-wearable device 702 may still include some audio processing capabilities (e.g., neural networks as described herein) to assist in enhancement by the mobile device 700. For example, one issue that users complain about is hearing a delayed version of their own voice. A technique known as "own voice detection" can be used to detect when the user is speaking and suppress the user's speech in the processing path. Because the ear-wearable device 702 is in close proximity to the user's vocal tract, it is well placed for own voice detection. As indicated by data path 716, the ear-wearable device can send data indicative of the user's speech (e.g., a suppression signal), and the sound enhancement 710 (or other audio processing component) can suppress the users speech in the final output 714.

The data path 716 may be configured to communicate other data that is descriptive of the conditions being experienced by the ear-wearable device 702. For example, the ear-wearable device 702 may make its own determination of a classification of ambient audio signal and/or an estimate of background noise level. While the ear-wearable device 702 and mobile device 700 may be in proximity, the aural environment experienced by each may be significantly different. As such, the ear-wearable device may send an ambient descriptor signal that enables tailoring the audio signal to the ambient conditions and/or noise being estimated at the ear-wearable device 702.

Figure 8:
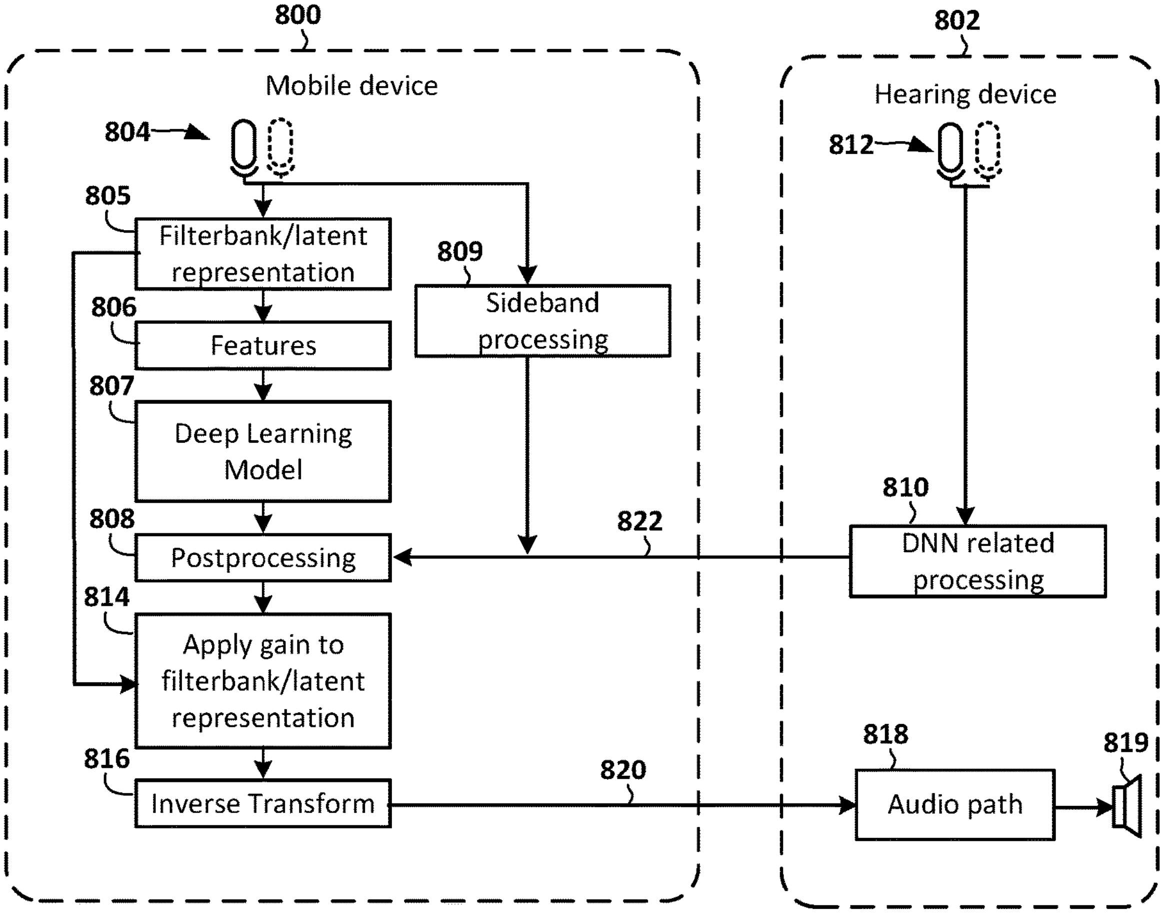
FIG. 8 is a block diagram of an audio processing path according to an example embodiment.

In FIG. 8, a diagram shows an audio sound enhancement processing path between a mobile device 800 and hearing device 802 according to an example embodiment. The mobile device 800 receives an audio signal at one or more microphones 804. The audio signal is sampled (e.g., via an analog to digital converter) and a set of L-samples are fed into a block 805 which may be a filterbank or a latent representation. A filterbank transforms the L-dimensional time-domain signal into a N-dimensional frequency domain representation. Examples for this filterbank are short-time fast Fourier transform and multirate filter banks. If configured as a latent representation, the processing block 805 may perform a matrix multiplication (or be a fully connected layer) that transforms the L-dimensional time-domain signal into a N-dimensional latent representation. Different from a filterbank, this transformation is learned during model training.

If the block 805 uses a filterbank, at least one of the following features may be calculated: (complex-valued) filterbank coefficients; power-compressed (e.g., x^c) (complex-valued) coefficients or amplitudes; logarithmic amplitudes (e.g., log(abs(x)); mel frequency cepstral coefficients (MFCCs); baseband phase differences; and instantaneous-frequency-deviation. If the input to the neural network 807 is multiple microphone signals, then phase differences, level differences, and/or coherence between the microphones 804 may be calculated and used by the filterbank.

The filterbank/latent representation 805 extracts features 806 that are input to a deep learning model 807. The deep learning model 807 can be any of the following type: a fully connected model; recurrent neural network (RNN) models, such as a (bidirectional), long-short-term memory (LSTM), gated recurrent unit (GRU), light GRU, convolutional recurrent neural network (CRNN), etc. The RNN model may contain learned skip updates for complexity reduction.

The output of the deep learning model 807 may be a real-valued, ideal ratio mask of phase sensitive mask or a complex-valued ideal ratio mask. The output of the model 807 is postprocessed 808 based on the sidechain phone processing 809 and/or information 810 send from the hearing device 802. The sidechain processing 809 may include own voice detection of the user's voice using the phase differences, level differences and/or coherence between at least two microphones 804 of the mobile device and/or data 810 received from the hearing device 802, the latter originating from one or more microphones 812 on the hearing device 802 or other sensors (e.g., accelerometer). The own voice detection may use a neural network on either or both devices 800, 802 for speaker verification. The sidechain processing 809 may include environment detection and background noise level estimation and use data from either device 800, 802.

The block 814 on the mobile device 800 applies gain to the post-processed data, and an inverse transform 816 is performed on N-dimensional filterbank coefficients or latent representation to transform them into an L-dimensional time domain representation. The time domain representation is sent via data link 820 to an audio path 818 of the hearing device 802. The hearing device 802 receives the processed signal from the mobile device 800 and plays the signal trough a receiver 819. The audio path 818 may provide its own processing of the enhanced signal, e.g., equalization to account for hearing loss of the user, compression/expansion of dynamic range, etc. The data link 820 may be any wired or wireless link suitable for digital audio signals, such as Bluetooth™ Low Energy (BLE) or a custom protocol tailored for the hearing device 802. Similarly, the data link 822 used for DNN related processing may use the same or similar wired or wireless link, e.g., Generic Attribute Profile (GATT) of BLE As noted above, the hearing device 802 may apply some additional DNN-related signal processing such as own voice detection using its own microphones 812. The hearing device 802 may also perform environment classification and background level estimation based on the signal from the microphones 812. In these embodiments, the hearing device 802 sends data to the phone which modifies the post processing step 808 on the mobile device 800 (e.g. when own voice is detected, the entire signal is suppressed, not only the noise). This can be done by analyzing spatial features of at least two microphones 804 of the smartphone 800. The own voice detection can utilize a speaker identification system, which may involve training data obtained from the hearing aid user. For example, the mobile device 800 may include a training application that analyzes the user's voice patterns during a training session and/or other activities (e.g., phone calls, with the user's consent).

The mobile device 800 and/or hearing device 802 may use a speech presence probability estimator (which can be a DNN as well) to determine when the external speaker is speaking, since the external speaker's voice may be much stronger in the mobile device's mic signal than the own voice signal. Similarly, own voice detection may compare the data stream from the mobile device microphone 804 with the hearing aid input signal from microphone 812. The hearing device user's own voice may be much louder in the hearing device microphone 812 than in the mobile device microphone 804.

Figure 9:
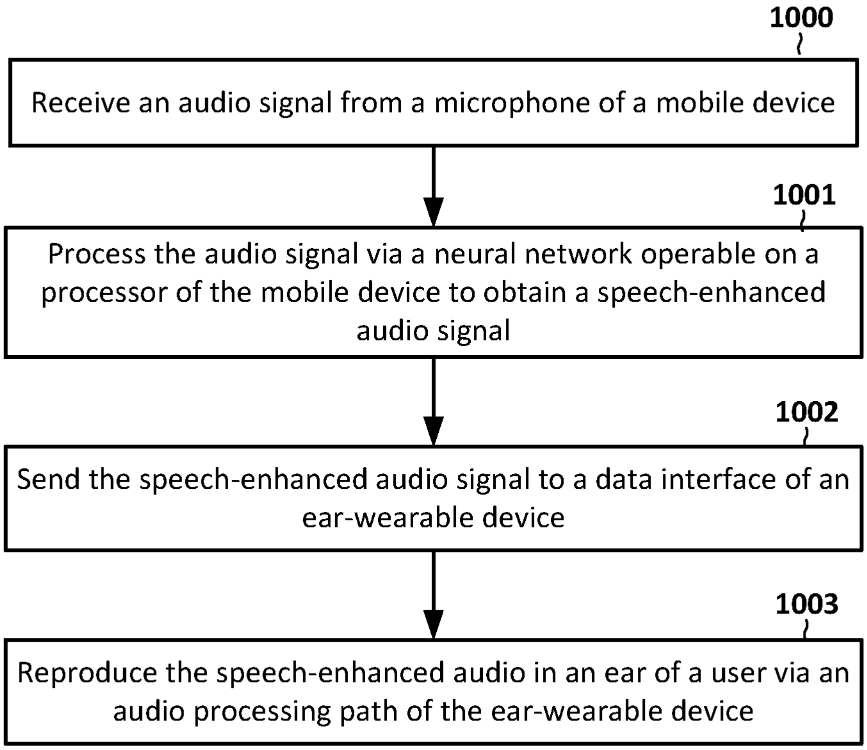
FIG. 9 is a flowchart of a method according to an example embodiment.

In FIG. 9, a flowchart shows a method according to an example embodiment. Generally, the method can be implemented within a system that includes an ear-wearable device and mobile device. The method involves receiving 1000 an audio signal from a microphone of a mobile device. The audio signal is processed 1001 via a neural network operable on a processor of the mobile device to obtain a speech-enhanced audio signal. The speech-enhanced audio signal is sent 1002 to a data interface of an ear-wearable device. The speech-enhanced audio is reproduced 1003 in an ear of a user via an audio processing path of the ear-wearable device.

Figure 10:
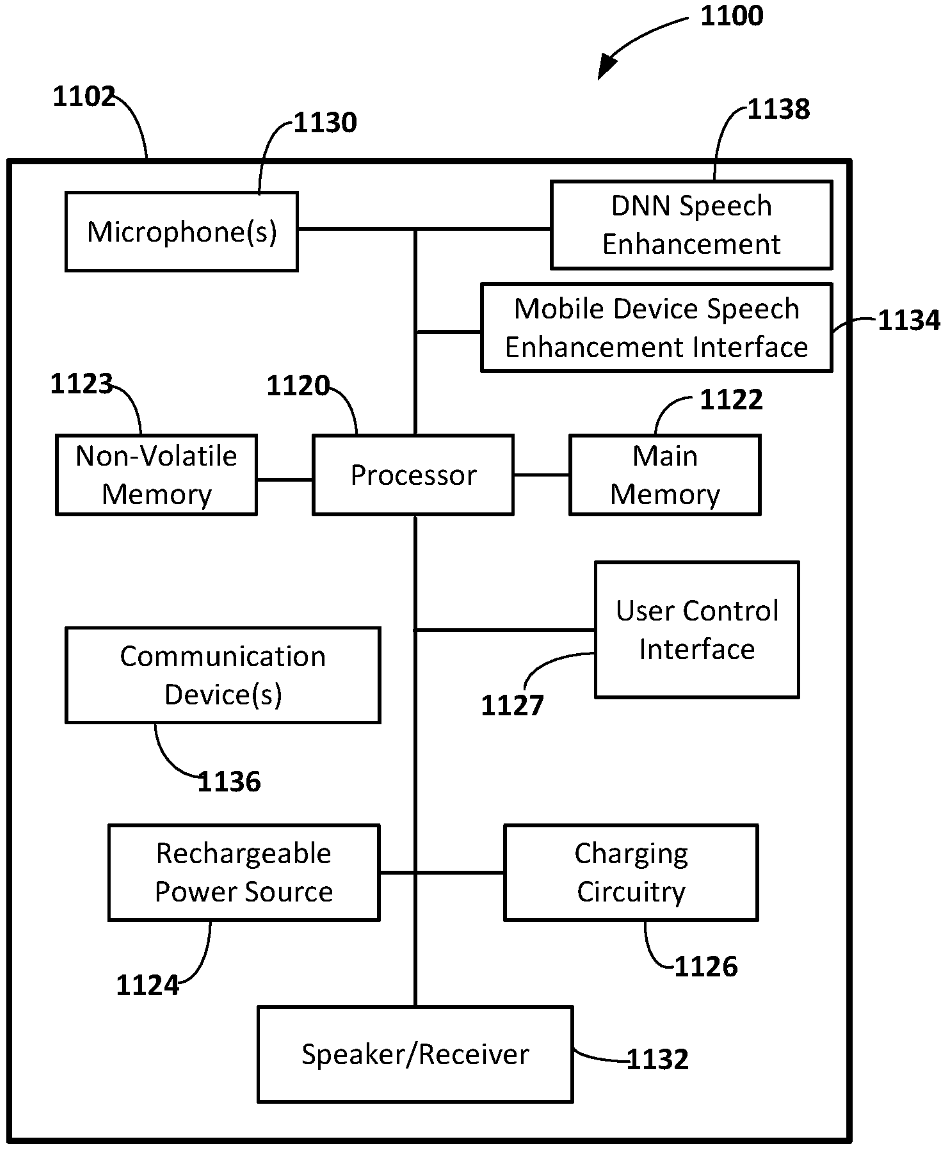
FIG. 10 is a block diagram of a hearing device according to an example embodiment.

In FIG. 10, a block diagram illustrates hardware of an ear-worn electronic device 1100 in accordance with any of the embodiments disclosed herein. The device 1100 includes a housing 1102 configured to be worn in, on, or about an ear of a wearer. The device 1100 shown in FIG. 7 can represent a single hearing device configured for monaural or single-ear operation or one of a pair of hearing devices configured for binaural or dual-ear operation. The device 1100 shown in FIG. 10 includes a housing 1102 within or on which various components are situated or supported. The housing 1102 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1100 includes a processor 1120 operatively coupled to a main memory 1122 and a non-volatile memory 1123. The processor 1120 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1120 can include or be operatively coupled to main memory 1122, such as RAM (e.g., DRAM, SRAM). The processor 1120 can include or be operatively coupled to non-volatile (persistent) memory 1123, such as ROM, EPROM, EEPROM or flash memory. As will be described in detail hereinbelow, the non-volatile memory 1123 is configured to store instructions that facilitate using a DNN based sound enhancer.

The hearing device 1100 includes an audio processing facility operably coupled to, or incorporating, the processor 1120. The audio processing facility includes audio signal processing circuitry (e.g., analog front-end, analog-to-digital converter, digital-to-analog converter, DSP, and various analog and digital filters), a microphone arrangement 1130, and a speaker or receiver 1132. The microphone arrangement 1130 can include one or more discrete microphones or a microphone array(s) (e.g., configured for microphone array beamforming). Each of the microphones of the microphone arrangement 1130 can be situated at different locations of the housing 1102. It is understood that the term microphone used herein can refer to a single microphone or multiple microphones unless specified otherwise.

The hearing device 1100 may also include a user interface with a user control interface 1127 operatively coupled to the processor 1120. The user control interface 1127 is configured to receive an input from the wearer of the hearing device 1100. The input from the wearer can be any type of user input, such as a touch input, a gesture input, or a voice input. The user control interface 1127 may be configured to receive an input from the wearer of the hearing device 1100 such as shown in FIG. 6.

The hearing device 1100 also includes a DNN speech enhancement module 1138 operably coupled to the processor 1120. The DNN speech enhancement module 1138 can be implemented in software, hardware, or a combination of hardware and software. The DNN speech enhancement module 1138 can be a component of, or integral to, the processor 1120 or another processor coupled to the processor 1120. The DNN speech enhancement module 1138 is configured to provide enhanced sound using a set of machine learning models.

According to various embodiments, the DNN speech enhancement module 1138 includes a plurality of neural network data objects each defining a respective neural network. The neural network data objects are stored in the persistent memory 1123. The module 1138 includes or utilizes a classifier that classifies an ambient environment of a digitized sound signal into one of a plurality of classifications. A neural network processor of the DNN speech enhancement module 1138 selects one of the neural network data objects to enhance the digitized sound signal based on the classification. Other signal processing modules of the device 1100 form an analog signal based on the enhanced digitized sound signal, the analog signal being reproduced via the receiver 1132.

The hearing device 1100 is also shown with a mobile device speech enhancement interface 1134 that can be used together with or independently of the DNN speech enhancement module 1138. The speech enhancement interface 1134 is operable to communicate with an external data interface of a mobile device. e.g., via one or more communications devices 1136 that are described in greater detail below. The processor 1120 of the hearing device 1100 (and associated audio circuitry) provides an audio processing path coupled to the speech enhancement interface 1134 and operable to receive speech-enhanced audio signal from the mobile device and reproduce the speech-enhanced audio in an ear of a user. The speech enhancement interface 1134 may also be used to send data to the mobile device, such as a suppression signal that indicates the user's own speech, and/or a an ambient descriptor signal that provides at least one of a classification of the ambient audio signal and an estimate of background noise level.

The hearing device 1100 can include one or more communication devices 1136 coupled to one or more antenna arrangements. For example, the one or more communication devices 1136 can include one or more radios that conform to an IEEE 802.11 (e.g., WiFi®) or Bluetooth® (e.g., BLE, Bluetooth® 4. 2, 5.0, 5.1, 5.2 or later) specification, for example. In addition, or alternatively, the hearing device 1100 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 1100 also includes a power source, which can be a conventional battery, a rechargeable battery (e.g., a lithium-ion battery), or a power source comprising a supercapacitor. In the embodiment shown in FIG. 5, the hearing device 1100 includes a rechargeable power source 1124 which is operably coupled to power management circuitry for supplying power to various components of the hearing device 1100. The rechargeable power source 1124 is coupled to charging circuitry 1126. The charging circuitry 1126 is electrically coupled to charging contacts on the housing 1102 which are configured to electrically couple to corresponding charging contacts of a charging unit when the hearing device 1100 is placed in the charging unit.

This document discloses numerous embodiments, including but not limited to the following: Embodiment 1 is a system, comprising a mobile device with a microphone, an external data interface, and a processor coupled to the microphone and the external data interface. The processor is configured with instructions to receive an audio signal from the microphone and process the audio signal via a neural network to obtain a speech-enhanced audio signal. An ear-wearable device has a data interface operable to communicate with the external data interface of the mobile device. The ear-wearable device has an audio processing path coupled to the data interface and operable to receive the speech-enhanced audio signal and reproduce the speech-enhanced audio in an ear of a user.

Embodiment 2 includes the system of embodiment 1, in which the ear-wearable device includes a sound processor configured to modify the speech enhanced audio to compensate for hearing loss of the user before reproducing the speech-enhanced audio. Embodiment 3 includes the system of any of embodiments 1 or 2, in which the ear-wearable device includes a sensor configured to detect speech of the user. In this case, the ear-wearable device is operable to send a suppression signal to the mobile device via the data interface in response to detecting the speech. The mobile device modifies the speech-enhanced audio signal to reduce interference of the speech with the speech-enhanced audio signal in response to the suppression signal.

Embodiment 4 includes the system of embodiment 3, in which the modifying the speech enhanced audio signal includes suppressing the speech-enhanced audio signal. Embodiment 5 includes the system of embodiment 3 or 4, in which the audio processing path includes a second neural network that detects the speech of the user. Embodiment 6 includes the system of any of embodiments 1-5, in which the ear-wearable device has a sensor configured to detect an ambient audio signal. The ear-wearable device is operable to send an ambient descriptor signal that provides at least one of a classification of the ambient audio signal and an estimate of background noise level. The mobile device modifies the speech-enhanced audio signal in response to the ambient descriptor signal. Embodiment 7 includes the system of embodiment 6, in which the neural network of the mobile device includes two or more neural networks. The processor of the mobile device is further operable to select one of the two or more neural networks to produce the speech enhanced audio signal based on the classification of the ambient descriptor signal received from the ear-wearable device.

Embodiment 8 includes the system of any of embodiments 1-7, in which the neural network includes any of a feed-forward neural network, a recurrent neural network, and a convolutional neural network. Embodiment 9 includes the system of any of embodiments 1-8, in which processing the audio signal via the neural network to obtain the speech-enhanced audio signal involves: transforming the audio signal from a time domain signal to a frequency domain signal; mapping features of the frequency domain signal to an input layer of the neural network; producing a ratio mask from the neural network and apply the ratio mask to the frequency domain signal; and inverse-transforming the masked frequency domain signal to a time domain to obtain the speech-enhanced signal.

Embodiment 10 includes the system of embodiment 9, in which processing the audio signal via the neural network to obtain the speech-enhanced audio signal further involves: performing side-chain processing on the audio signal to determine disturbances to the audio signal; using an output of the side-chain processing to perform postprocessing on the masked frequency domain signal before the inverse-transform. Embodiment 11 includes the system of embodiment 10, in which the side-chain processing includes own-voice detection of speech of the user using the microphone of the mobile device and a second microphone of the mobile device. The own-voice detection is based on at least one phase differences, level differences, and coherence between the microphone and the second microphone. Embodiment 12 includes the system of embodiment 11, in which the own-voice detection is performed using a second neural network. Embodiment 13 includes the system of any of embodiments 10-12, in which the side-chain processing includes at least one of environment detection and background noise level estimation.

Embodiment 14 includes the system of any of embodiments 1-8 and 10-12, in which processing the audio signal via the neural network to obtain the speech-enhanced audio signal involves: transforming the audio signal from a time domain signal to a latent representation; mapping features of the latent representation to an input layer of the neural network; and inverse-transforming an output of the neural network to the speech-enhanced signal.

Embodiment 15 is a computer-readable medium storing instructions operable by a processor of a mobile device to perform: coupling the mobile device to an ear-wearable device; receiving an audio signal from a microphone of the mobile device; processing the audio signal via a neural network to obtain a speech-enhanced audio signal; and sending the speech-enhanced audio to an ear-wearable device, the ear-wearable device receiving the speech-enhanced audio signal and reproducing the speech-enhanced audio in an ear of a user.

Embodiment 16 includes the computer-readable medium of embodiment 15, in which the ear-wearable device includes a sensor configured to detect speech of the user. The ear-wearable device is operable to send a suppression signal to the mobile device via the data interface in response to detecting the speech. The instructions cause the processor to modify the speech-enhanced audio signal to reduce interference of the speech with the speech-enhanced audio signal in response to the suppression signal.

Embodiment 17 includes the computer-readable medium of embodiment 15 or 16, in which the ear-wearable device includes a sensor configured to detect an ambient audio signal. The ear-wearable device is operable to send an ambient descriptor signal that provides at least one of a classification of the ambient audio signal and an estimate of background noise level. The instructions cause the processor to modify the speech-enhanced audio signal in response to the ambient descriptor signal.

Embodiment 18 includes the computer-readable medium of embodiment 17, in which the neural network of the mobile device includes two or more neural networks, in which the instructions cause the processor to select one of the two or more neural networks to produce the speech enhanced audio signal based on the classification of the ambient audio signal received from the ear-wearable device. Embodiment 19 includes the computer-readable medium of any of embodiments 15-18, in which the neural network includes any of a feed-forward neural network, a recurrent neural network, and a convolutional neural network.

Embodiment 20 includes the computer-readable medium of any of embodiments 15-19, in which processing the audio signal via the neural network to obtain the speech-enhanced audio signal involves: transforming the audio signal from a time domain signal to a frequency domain signal; mapping features of the frequency domain signal to an input layer of the neural network; producing a ratio mask from the neural network and apply the ratio mask to the frequency domain signal; and inverse-transforming the masked frequency domain signal to a time domain to obtain the speech-enhanced signal.

Embodiment 21 includes the computer-readable medium of any of embodiments 15-20, in which processing the audio signal via the neural network to obtain the speech-enhanced audio signal further involves: performing side-chain processing on the audio signal to determine disturbances to the audio signal; using an output of the side-chain processing to perform postprocessing on the masked frequency domain signal before the inverse-transform. Embodiment 22 includes the computer-readable medium of embodiment 21, in which the side-chain processing involves own-voice detection of speech of the user using the microphone of the mobile device and a second microphone of the mobile device, the own-voice detection based on at least one phase differences, level differences, and coherence between the microphone and the second microphone. Embodiment 23 includes the computer-readable medium of embodiment 22, in which the own-voice detection is performed using a second neural network. Embodiment 24 includes the computer-readable medium of any of embodiments 21-23, in which the side-chain processing involves at least one of environment detection and background noise level estimation.

Embodiment 25 includes the computer-readable medium of any of embodiments 15-19 and 21-24, in which processing the audio signal via the neural network to obtain the speech-enhanced audio signal involves: transforming the audio signal from a time domain signal to a latent representation; mapping features of the latent representation to an input layer of the neural network; and inverse-transforming an output of the neural network to the speech-enhanced signal.

Embodiment 26 is a method, that involves: receiving an audio signal from a microphone of a mobile device; processing the audio signal via a neural network operable on a processor of the mobile device to obtain a speech-enhanced audio signal; sending the speech-enhanced audio signal to a data interface of an ear-wearable device; and reproducing the speech-enhanced audio in an ear of a user via an audio processing path of the ear-wearable device.

Embodiment 27 includes the method of embodiment 26, further comprising modifying the speech enhanced audio via the audio processing path of the ear-wearable device to compensate for hearing loss of the user before reproducing the speech-enhanced audio. Embodiment 28 includes the method of embodiment 26 or 27, further involving: sending a suppression signal to the mobile device via the data interface in response to detecting speech of the user via the ear-wearable device; and modifying the speech-enhanced audio signal at the mobile device to reduce interference of the speech with the speech-enhanced audio signal in response to the suppression signal. Embodiment 29 includes the method of embodiment 28, in which the modifying the speech enhanced audio signal includes suppressing the speech-enhanced audio signal. Embodiment 30 includes the method of embodiment 28 or 29, in which the audio processing path includes a second neural network that detects the speech of the user.

Embodiment 31 includes the method of any of embodiments 26-30, and further involves: sending an ambient descriptor signal to the mobile device via the data interface that provides at least one of a classification of the ambient audio signal and an estimate of background noise level at the ear-wearable device; and modifying the speech-enhanced audio signal at mobile device in response to the ambient descriptor signal.

Embodiment 32 includes the method of embodiment 31, in which the neural network of the mobile device includes two or more neural networks, the method further comprising selecting one of the two or more neural networks to produce the speech enhanced audio signal based on the classification of the ambient descriptor signal received from the ear-wearable device. Embodiment 33 includes the method of any of embodiments 26-32, in which the neural network includes any of a feed-forward neural network, a recurrent neural network, and a convolutional neural network.

Embodiment 34 includes the method of any of embodiment 26-33, in which processing the audio signal via the neural network to obtain the speech-enhanced audio signal involves: transforming the audio signal from a time domain signal to a frequency domain signal; mapping features of the frequency domain signal to an input layer of the neural network; producing a ratio mask from the neural network and apply the ratio mask to the frequency domain signal; and inverse-transforming the masked frequency domain signal to a time domain to obtain the speech-enhanced signal.

Embodiment 35 includes the method of embodiment 34, in which processing the audio signal via the neural network to obtain the speech-enhanced audio signal further involves: performing side-chain processing on the audio signal to determine disturbances to the audio signal; and using an output of the side-chain processing to perform postprocessing on the masked frequency domain signal before the inverse-transform. Embodiment 36 includes the method of embodiment 35, in which the side-chain processing includes own-voice detection of speech of the user using the microphone of the mobile device and a second microphone of the mobile device. The own-voice detection is based on at least one phase differences, level differences, and coherence between the microphone and the second microphone.

Embodiment 37 includes the method of embodiment 36, in which the own-voice detection is performed using a second neural network. Embodiment 38 includes the method of embodiment 35, in which the side-chain processing includes at least one of environment detection and background noise level estimation. Embodiment 39 includes the method of any of embodiments 26-33 and 35-38, in which processing the audio signal via the neural network to obtain the speech-enhanced audio signal involves: transforming the audio signal from a time domain signal to a latent representation; mapping features of the latent representation to an input layer of the neural network; and inverse-transforming an output of the neural network to the speech-enhanced signal.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system, comprising:
- a mobile device, comprising:
  - a microphone;
  - an external data interface; and
  - a processor coupled to the microphone and the external data interface, the processor configured with instructions to receive an audio signal from the microphone and process the audio signal via a neural network to obtain a speech-enhanced audio signal; and
- an ear-wearable device comprising:
  - a data interface operable to communicate with the external data interface of the mobile device;
  - a sensor configured to detect speech of a user; and
  - an audio processing path coupled to the data interface, the ear-wearable device being operable to:
    - send a suppression signal to the mobile device via the data interface in response to detecting the speech, the mobile device modifying the speech-enhanced audio signal to reduce interference of the speech with the speech-enhanced audio signal in response to the suppression signal; and
    - receive the speech-enhanced audio signal and reproduce the speech-enhanced audio in an ear of a user.

2. The system of claim 1, wherein the ear-wearable device comprises a sound processor configured to modify the speech enhanced audio to compensate for hearing loss of the user before reproducing the speech-enhanced audio.

3. The system of claim 1, wherein modifying the speech enhanced audio signal comprises suppressing the speech-enhanced audio signal.

4. The system of claim 1, wherein the audio processing path comprises a second neural network that detects the speech of the user.

5. The system of claim 1, wherein the sensor of the ear-wearable device is configured to detect an ambient audio signal, and wherein the ear-wearable device is operable to send an ambient descriptor signal that provides at least one of a classification of the ambient audio signal and an estimate of background noise level, the mobile device modifying the speech-enhanced audio signal in response to the ambient descriptor signal.

6. The system of claim 5, wherein the neural network of the mobile device comprises two or more neural networks, and wherein the processor of the mobile device is further operable to select one of the two or more neural networks to produce the speech enhanced audio signal based on the classification of the ambient descriptor signal received from the ear-wearable device.

7. The system of claim 1, wherein the neural network comprises any of a feed-forward neural network, a recurrent neural network, and a convolutional neural network.

8. A system, comprising:
- a mobile device, comprising:
- a microphone;
- an external data interface; and
- a processor coupled to the microphone and the external data interface, the processor configured with instructions to receive an audio signal from the microphone and process the audio signal via a neural network to obtain a speech-enhanced audio signal, wherein processing the audio signal via the neural network to obtain the speech-enhanced audio signal comprises:
  - transforming the audio signal from a time domain signal to a frequency domain signal;
  - mapping features of the frequency domain signal to an input layer of the neural network;
  - producing a ratio mask from the neural network and apply the ratio mask to the frequency domain signal; and
  - inverse-transforming the masked frequency domain signal to a time domain to obtain the speech-enhanced signal; and
- an ear-wearable device comprising a data interface operable to communicate with the external data interface of the mobile device, the ear-wearable device comprising an audio processing path coupled to the data interface and operable to receive the speech-enhanced audio signal and reproduce the speech-enhanced audio in an ear of a user.

9. The system of claim 8, wherein processing the audio signal via the neural network to obtain the speech-enhanced audio signal further comprises
- performing side-chain processing on the audio signal to determine disturbances to the audio signal; and
- using an output of the side-chain processing to perform post processing on the ratio masked frequency domain signal before the inverse-transform.

10. The system of claim 9, wherein the side-chain processing comprises own-voice detection of speech of the user using the microphone of the mobile device and a second microphone of the ear-wearable device, the own-voice detection based on at least one of phase differences, level differences, and coherence between the microphone and the second microphone.

11. The system of claim 9, wherein the side-chain processing comprises at least one of environment detection and background noise level estimation.

12. The system of claim 1, wherein processing the audio signal via the neural network to obtain the speech-enhanced audio signal comprises:
- transforming the audio signal from a time domain signal to a latent representation;

mapping features of the latent representation to an input layer of the neural network; and inverse-transforming an output of the neural network to the speech-enhanced signal.

13. A method, comprising:

receiving an audio signal from a microphone of a mobile device;

processing the audio signal via a neural network operable on a processor of the mobile device to obtain a speech-enhanced audio signal;

sending the speech-enhanced audio signal to a data interface of an ear-wearable device;

detecting speech of a user via a sensor of the ear-wearable device;

sending from the ear-wearable device to the mobile device a suppression signal in response to detecting the speech;

modifying the speech-enhanced audio signal via the mobile device to reduce interference of the speech with the speech-enhanced audio signal in response to the suppression signal; and reproducing the speech-enhanced audio in an ear of a user via an audio processing path of the ear-wearable device.

14. The method of claim 13, wherein modifying the speech enhanced audio signal comprises suppressing the speech-enhanced audio signal.

15. The method of claim 13, wherein the audio processing path comprises a second neural network that detects the speech of the user.

16. The method of claim 13, further comprising:

detecting an ambient audio signal via the ear-wearable device;

sending from the ear-wearable device to the mobile device an ambient descriptor signal that provides at least one of a classification of the ambient audio signal and an estimate of background noise level; and modifying the speech-enhanced audio signal via the mobile device in response to the ambient descriptor signal.

17. The method of claim 13, wherein processing the audio signal via the neural network to obtain the speech-enhanced audio signal comprises:

transforming the audio signal from a time domain signal to a latent representation;

mapping features of the latent representation to an input layer of the neural network; and inverse-transforming an output of the neural network to the speech-enhanced signal.

18. A non-transitory, computer-readable medium storing instructions operable by a processor of a mobile device to perform the method of claim 13.

* * * * *